March 15, 1960 R. HART 2,928,586
STATOR FOR MULTI-STAGE AXIAL-FLOW COMPRESSOR
Filed Oct. 22, 1956
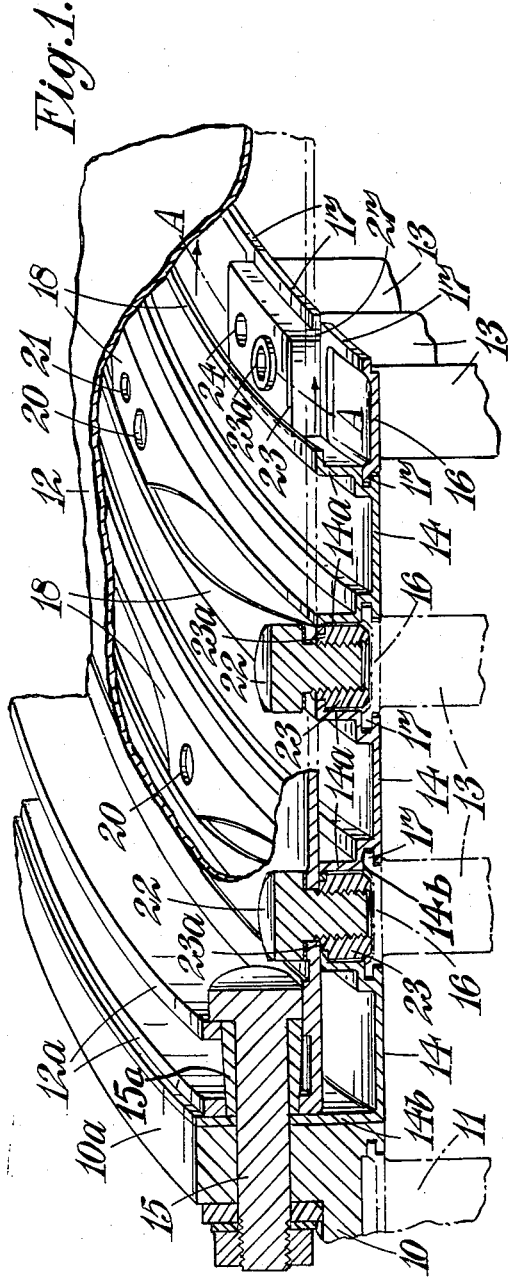
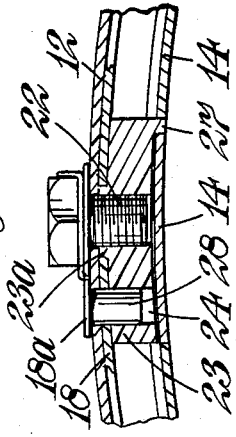
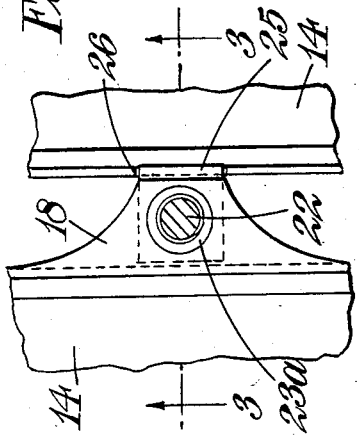

United States Patent Office 2,928,586
Patented Mar. 15, 1960

2,928,586

STATOR FOR MULTI-STAGE AXIAL-FLOW COMPRESSOR

Raymond Hart, Ockbrook, England, assignor to Rolls-Royce Limited, Derby, England, a British company Application October 22, 1956, Serial No. 617,478

Claims priority, application Great Britain October 31, 1955

4 Claims. (Cl. 230—133)

This invention relates to multi-stage axial-flow compressors, such for instance as are employed in gas-turbine engines.

In United States Patent No. 2,645,413 (Rolls-Royce Limited), there is described and claimed a stator for a multi-stage axial-flow compressor comprising a tubular casing and a stator-blade assembly which includes circumferentially-disposed blades having blade platforms extending axially of the casing and circumferentially so that in assembly the platforms constitute a continuous circumferential ring at the roots of the blades, each of the axially-spaced faces of the set of blade platforms engaging with an adjacent spacer ring to retain the blades axially spaced from one another, and the blade platforms interlocking with the spacer rings to retain the blades radially in position, and means for locating the assembly of rings and stator blades coaxially within the casing. In the form of stator axial-flow compressor shown, the casing is split diametrically and the spacer rings are formed in halves to permit the blade and ring assembly to be assembled in halves in the casing parts which are thereafter secured together. It is said moreover that the casing need not be split and that in this case the spacer rings may be of continuous circular form. The means described for locating the blade and ring assembly in the casing comprises an axial abutment on the casing for one end of the assembly and means co-operating with the opposite end of the assembly to load it axially against the abutment.

This invention has for an object to provide a construction of stator for a multi-stage axial-flow compressor in which clearances between the stator blades and the rotor blading are accurately maintained.

According to the present invention, a stator for a multi-stage axial-flow compressor comprises a tubular thin-walled casing and within the casing an assembly of axially-spaced rows of stator blades, spacer rings between the rows of blades, which blades have at their root ends axially- and circumferentially-extending platforms interlocking at their axially-spaced edges with the spacer rings to retain the blades axially and radially in position, and each of which spacer rings has at its axially-spaced edges flange portions extending axially over the blade platforms and in contact with the casing, and means co-operating with the flanges to secure each spacer ring to the casing.

Preferably the flanges of the spacer rings are scalloped, and the scallops on each spacer ring are angularly offset with respect to the corresponding parts of the adjacent spacer rings so that the portions of the flanges having the greatest axial dimension are axially aligned with the narrowest portions of adjacent flanges, the means securing the spacer rings in position co-operating with the portions of greatest axial dimension.

Conveniently, the means securing the spacer rings to the casing comprises nut members trapped between the flanges and the blade platforms and bolts extending through aligned holes in the casing and flanges to engage with the nut members. Dowel pins extending through aligned holes in the casing, flanges and nut members may be provided to locate the spacer rings angularly with respect to the casing, and the nut members may also be provided with lugs to abut the blade platforms to prevent angular displacement of the blades.

The blades may be secured together in groups to facilitate their assembly between the associated spacer rings.

One construction of stator for a multi-stage axial-flow compressor will now be described with reference to the accompanying drawings, in which—

Figure 1 is a perspective view of the compressor stator with parts broken away,

Figure 1A is a section on the line A—A of Figure 1, and

Figures 2 and 3 show a modification of the spacer ring shown in Figures 1 and 1A, Figure 2 being a section on the line 2—2 of Figure 3, and Figure 3 being a section on the line 3—3 of Figure 2.

The compressor stator comprises a casting 10 which affords the outer wall of the inlet of the compressor and which has a row of inlet guide vanes 11 mounted therein in any convenient way. The stator also comprises a fully-machined sheet steel main casing 12 which is fully tubular, and an assembly comprising a series of rows of stator blades 13 and intermediate spacer rings 14 accommodated within the casing 12.

The casting 10 has a flange 10a and the casing 12 has a pair of axially-spaced flanges 12a; the flange 10a abuts one of the flanges 12a and they are secured together by bolts 15 each passing through a tapered bush 15a engaging in tapered holes in the flanges 12a, the tapered bushes 15a being brazed into the tapered holes.

The assembly of blades 13 and spacer rings 14 are supported in the casing 12 in the following way.

Each ring 14 is of channel section whereof the base portion forms part of the wall of the compressor working fluid passage, and whereof the axially-spaced walls 14a, extend radially outwards into contact with the casing 12. The end ring 14 has one such wall 14a and an axially-spaced wall 14b adjacent the casting 10 which is longer than the wall 14a and is trapped between the flanges 10a, 12a.

Each blade 13 is provided with an axially- and circumferentially-extending root platform 16 having at its axially-spaced edges axially-projecting flanges 17 which are offset away from the working fluid passage and which interlock with peripheral grooves 14b in the adjacent spacer rings 14. Thus the blades are supported radially and axially with respect to the spacer rings.

The walls 14A of the spacer rings 14 are provided at their radially outer edges with axially-directed scalloped flanges 18 which are in contact with the casing and extend radially outside the blade platforms. Adjacent spacer rings 14 are arranged within the casing with the scallops in their flanges 18 angularly offset from one another so that the parts of a flange 18 having the greatest axial dimension are adjacent to the narrowest part of the next flange.

Some of those parts of the flanges 18 having the greatest axial extent have in them single holes 20 which are aligned with corresponding holes in the casing 12, and others of these parts have additional holes 21 of smaller diameter. Bolts 22 extend through the holes in the casing 12 and the holes 20 to engage squared nuts 23 trapped between the flanges 18 and the blade platforms 16. The nuts 23 are provided with upstanding necks 23a which project into the holes 20 and are a tight fit therein to retain the nuts in position before the bolts are tightened.

The holes 21 and the aligned holes in the casing are occupied by dowel pins 28 which project into corresponding holes 24 in circumferential extensions of the corresponding nuts 23 and which conveniently have flanged heads 28a trapped under the bolts 22. The dowel pin holes in the casing are positioned angularly to insure the correct angular relationship between the scalloped flanges 18. In addition, as shown in Figures 2 and 3, one or more of the nuts 23 may be provided with an axially-projecting dog 25 which engages a notch 26 in the spacer ring which is next to that through which the bolt 22 associated with the nut passes, in order to locate the rings relative to one another on assembly.

The nuts 23 may also serve to restrain angular displacement of the blades 13 due to the loads experienced in operation. Thus, for instance, as shown in Figure 1, those nuts 23 having both a bolt and a dowel pin engaging them may be formed with radially-inwardly-projecting lugs 27 which in assembly project between pairs of platforms 16.

The spacer rings 14 are preferably continuous, but if desired they may be made in part-annular sections each with associated bolting means to retain it in position in the casing, and an associated dowel for circumferential location.

The blades 13 may be secured together in groups of say six blades before assembly into the casing, for example by welding together of their inner or outer platforms.

It will be appreciated that not only is the compressor stator of light but strong construction but also the blades are accurately positioned in the casing in all senses.

I claim:

1. A stator for a multi-stage axial-flow compressor comprising a tubular thin-walled casing and within the casing an assembly of axially-spaced rows of stator blades, spacer rings between the rows of blades, the stator blades having at their root ends axially- and circumferentially-extending platforms and the platforms having at their axially-spaced edges axially-extending features interlocking in the radial sense with complementally-formed features on the axially-spaced edges of the spacer rings to retain the blades axially and radially in position, each spacer ring having flanges at its axially-spaced edges, which flanges have axially-extending portions which project between the blade platforms and casing in radially spaced relation to the blade platforms and in contact with the casing, and means securing the flanges to the casing comprising nut members trapped in the spaces between the axially-extending portions of the flanges and the blade platforms and bolts extending through aligned holes in the casing and in the axially-extending portions of the flanges and engaging the nut members.

2. A stator as claimed in claim 1, wherein the nut members have lugs extending between circumferentially-facing ends of the blade platforms to prevent angular displacement of the blades.

3. A stator for a multi-stage axial-flow compressor comprising a tubular thin-walled casing and within the casing an assembly of axially-spaced rows of stator blades, spacer rings between the rows of blades, the stator blades having at their root ends axially- and circumferentially- extending platforms and the platforms having at their axially-spaced edges axially-extending features interlocking in the radial sense with complementally-formed features on the axially-spaced edges of the spacer rings to retain the blades axially and radially in position, each spacer ring having flanges at its axially-spaced edges, which flanges have axially-extending portions which project between the blade platforms and casing in radially spaced relation to the blade platforms and in contact with the casing, the scallops on each spacer ring being angularly offset with respect to the corresponding parts of the adjacent spacer rings so that the parts of the axially-extending portions of the flanges having the greatest axial dimension are axially aligned with the narrowest parts of adjacent flanges, and means securing the spacer rings to the casing comprising nut members trapped in the spaces between said parts having the greatest axial dimension and the blade platforms and bolts extending through aligned holes in the casing and in said parts having the greatest axial dimension and engaging the nut members.

4. A stator for a multi-stage axial-flow compressor comprising a tubular thin-walled casing and within the casing an assembly of axially-spaced rows of stator blades, spacer rings between the rows of blades, the stator blades having at their root ends axially- and circumferentially-extending platforms and the platforms having at their axially-spaced edges axially-extending features interlocking in the radial sense with complementally-formed features on the axially-spaced edges of the spacer rings to retain the blades axially and radially in position, each spacer ring having flanges at its axially-spaced edges, which flanges have axially-extending portions which project between the blade platforms and casing in radially spaced relation to the blade platforms and in contact with the casing, and means securing the flanges to the casing comprising nut members trapped in the spaces between the axially-extending portions of the flanges and the blade platforms and bolts extending through aligned holes in the casing and in the axially-extending portions of the flanges and engaging the nut members, said nut members having circumferential extensions and said means comprising also dowel pins extending through aligned holes provided in the casing, in the axially-extending portions of the flanges and in the circumferential extensions to locate them circumferentially with respect to one another.

References Cited in the file of this patent

UNITED STATES PATENTS

| 2,625,793 | Mierley et al. | Jan. 30, 1953 |
| 2,689,682 | Boyd et al. | Sept. 21, 1954 |
| 2,716,563 | Seneschall | Aug. 30, 1955 |
| 2,749,026 | Hasbrouch et al. | June 5, 1956 |
| 2,763,462 | McDowall et al. | Sept. 18, 1956 |

FOREIGN PATENTS

| 1,095,078 | France | May 26, 1955 |